(12) United States Patent
Yu

(10) Patent No.: US 6,240,239 B1
(45) Date of Patent: May 29, 2001

(54) TUNERLESS CAMCORDER WHICH RESERVATION-RECORDS A BROADCASTING SIGNAL AND METHOD THEREOF

(75) Inventor: Jae-Chon Yu, Seoul (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 08/266,306

(22) Filed: Jun. 27, 1994

Related U.S. Application Data

(63) Continuation of application No. 08/005,431, filed on Jan. 19, 1993, now abandoned.

(30) Foreign Application Priority Data

Jan. 16, 1992 (KR) .................................................... 92-526

(51) Int. Cl.[7] ............................... H04N 5/76; H04N 5/225
(52) U.S. Cl. ............................................. 386/83; 386/117
(58) Field of Search ................................... 358/909, 906, 358/335, 310; 348/731, 207, 732, 734, 906; 455/186.1, 186.2; 360/33.1; 386/83, 117; H04N 5/225, 5/76, 5/78, 5/92, 9/79

(56) References Cited

U.S. PATENT DOCUMENTS

| 4,641,205 | * | 2/1987 | Beyers, Jr. | 360/33.1 |
|---|---|---|---|---|
| 4,796,107 | * | 1/1989 | Hiraki | 360/33.1 |
| 4,963,994 | * | 10/1990 | Levine | 358/335 |
| 4,977,455 | * | 12/1990 | Young | 455/186.1 |
| 5,142,379 | * | 8/1992 | Jung et al. | 358/335 |
| 5,262,903 | * | 11/1993 | Kim | 358/335 |

* cited by examiner

Primary Examiner—Thai Tran
(74) Attorney, Agent, or Firm—Sughrue, Mion, Zinn, Macpeak & Seas, PLLC

(57) ABSTRACT

A camcorder includes a receiver for receiving reservation-recording information generated from a key input unit for operating a TV, a microcomputer for storing the reservation-recording information received through the receiver in its internal memory and controlling the apparatus in accordance with the received reservation-recording information, a signal output circuit for outputting control information under the control of the microcomputer to operate the TV, and a recording system for recording the broadcasting signal transmitted through a line from the TV onto a recording medium under the control of the microcomputer.

23 Claims, 3 Drawing Sheets

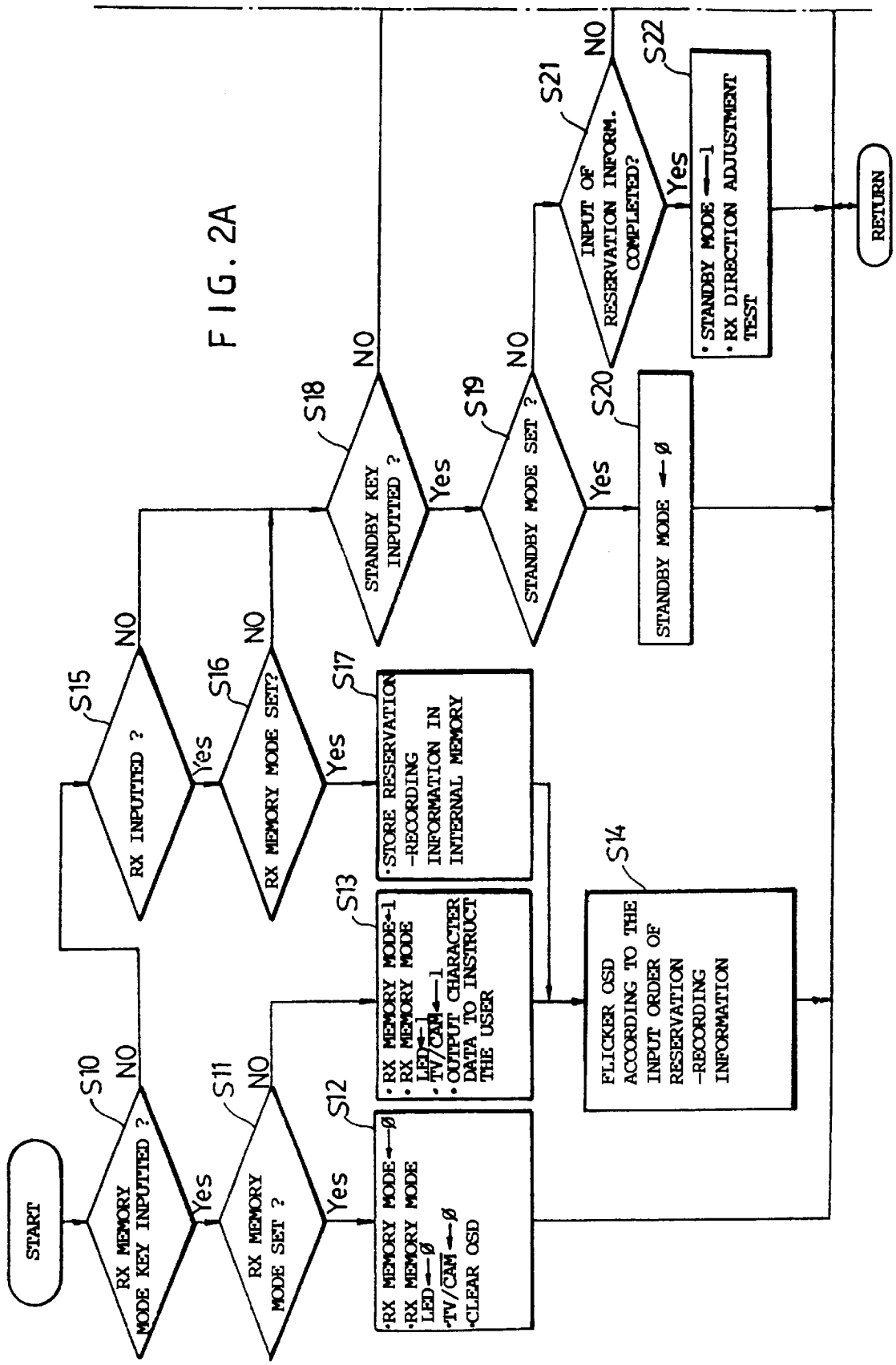

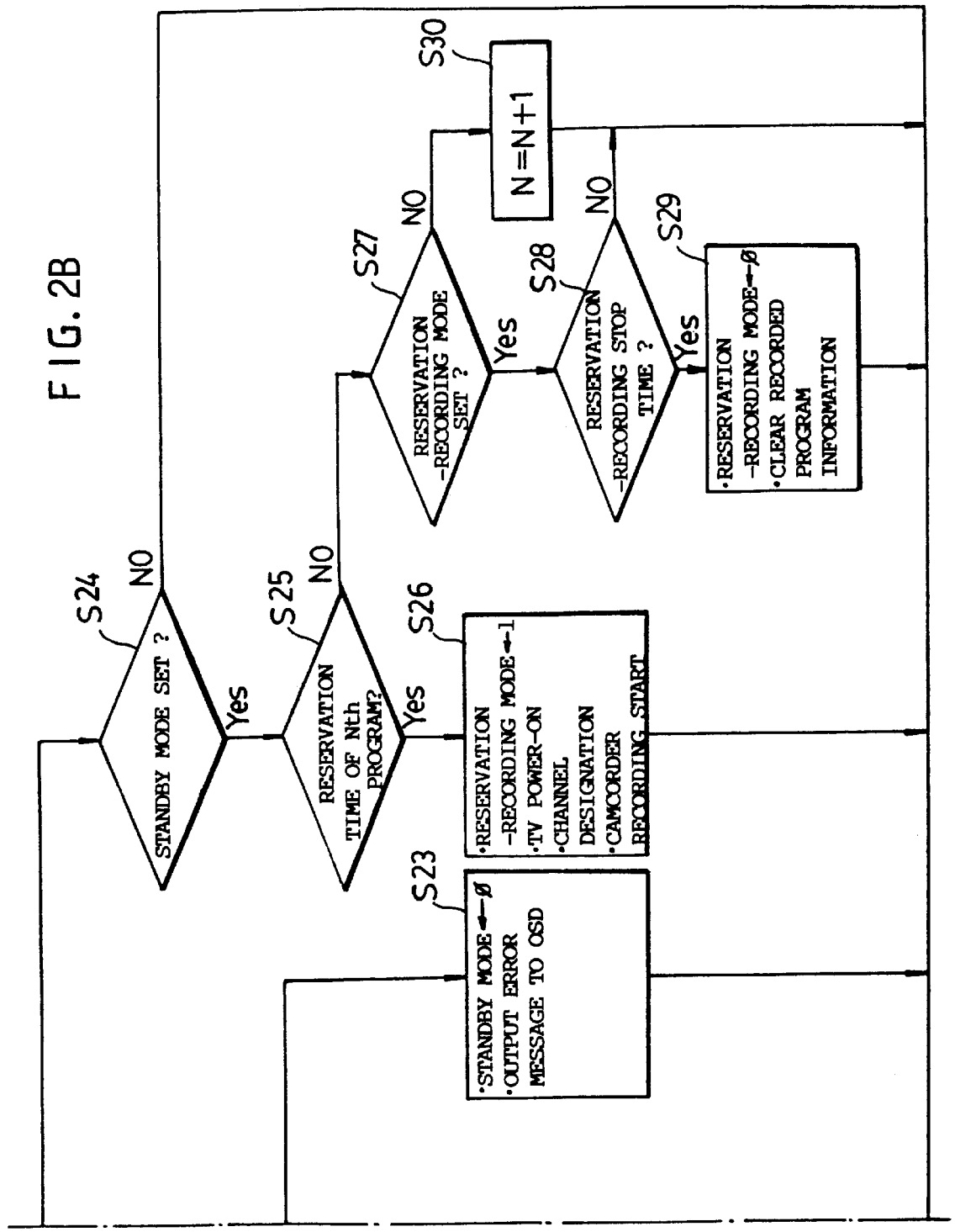

TUNERLESS CAMCORDER WHICH RESERVATION-RECORDS A BROADCASTING SIGNAL AND METHOD THEREOF

This is a Continuation of application Ser. No. 08/005,431 filed Jan. 19, 1993, now abandoned.

FIELD OF THE INVENTION

The present invention relates in general to a camcorder, and more particularly to an apparatus for reservation-recording a broadcasting signal in a camcorder and a method thereof. This application is based on Korean Patent Application No. 92-526 filed Jan. 16, 1992, which is herein incorporated by reference.

BACKGROUND OF THE INVENTION

Generally, a camcorder records image information of an object inputted therein through a camera on a recording medium thereof such as a magnetic tape (for example, a cassette tape) and plays back the image information recorded on the recording medium through an external display means such as a television. A camcorder has no tuner so broadcasting signals cannot be independently received by the camcorder. The camcorder may, however, be connected to a reception apparatus such as a television via a data transmission line to record a broadcasting signal being presently received by the reception apparatus onto the magnetic tape.

However, when used in this manner, the conventional camcorder has a disadvantage in that it has no reservation-recording function for recording a desired broadcasting program at a desired time in the future. Namely, in a conventional camcorder which has no tuner, broadcasting information of a particular channel being received by the reception apparatus such as a television cannot be reservation-recorded on the magnetic tape of the camcorder.

SUMMARY OF THE INVENTION

Therefore, the present invention has been made in view of the above problem, and it is an object of the present invention to provide an apparatus for reservation-recording a broadcasting signal in a camcorder and a method thereof.

In accordance with one aspect of the present invention, there is provided a method of reservation-recording a broadcasting signal in a camcorder, comprising the steps of:

(a) storing reservation-recording information from a broadcasting signal receivable means in an internal memory of a recording means with no tuner;

(b) operating said broadcasting signal receivable means on the basis of the reservation-recording information stored at said step (a) when a present time is the reservation-recording time of the stored reservation-recording information; and (c) recording the broadcasting signal from said broadcasting signal receivable means operated at said step (b).

In accordance with another aspect of the present invention, there is provided an apparatus for reservation-recording a broadcasting signal in a camcorder comprising: receiving means for receiving reservation-recording information generated from key input means for operating a broadcasting signal receivable means; a microcomputer for storing the reservation-recording information received through said receiving means in its internal memory and controlling the camcorder in accordance with the received reservation-recording information; signal output means for outputting recording information under the control of said microcomputer to operate said broadcasting signal receivable means; and recording means for recording the broadcasting signal transmitted from said broadcasting signal receivable means on a recording medium under the control of said microcomputer.

BRIEF DESCRIPTION OF THE DRAWINGS

The above and other objects, features and advantages of the present invention will be more clearly understood from the following detailed description taken in conjunction with the accompanying drawings, in which:

FIGS. 2A and 2B show a flowchart illustrating a method of reservation-recording a broadcasting signal in a camcorder in accordance with the present invention.

DETAILED DESCRIPTION OF THE INVENTION

Figure 1:
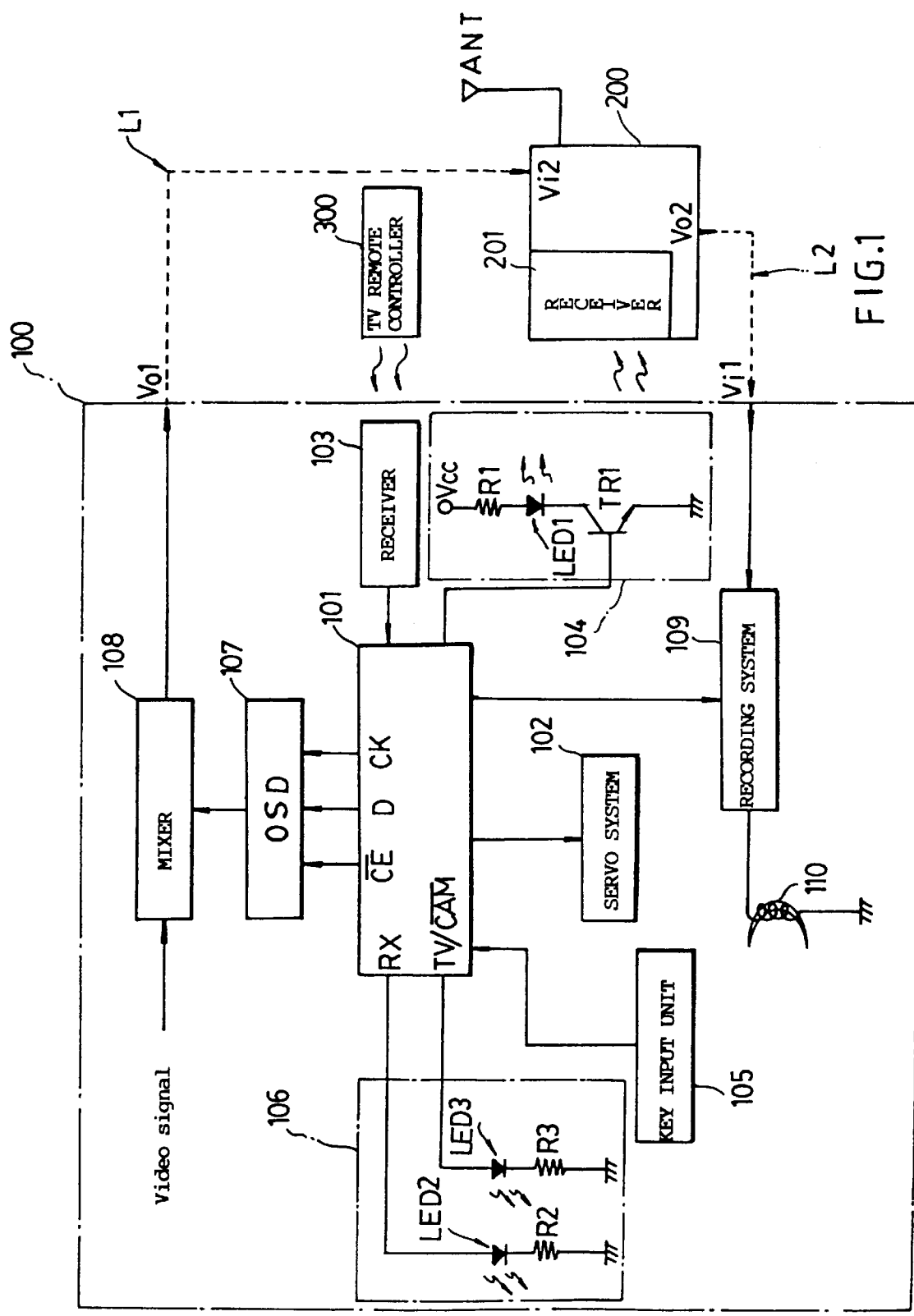
FIG. 1 is a block diagram of an apparatus for reservation-recording a broadcasting signal in a camcorder in accordance with the present invention.

Referring to FIG. 1, there is shown a block diagram of an apparatus for reservation-recording a broadcasting signal in a camcorder in accordance with the present invention. Herein, the camcorder reservation-recording apparatus of the present invention is designated by the reference numeral 100 and is adapted to reservation-record the broadcasting signal being received by a broadcasting signal receivable television (TV) 200.

In FIG. 1, the camcorder reservation-recording apparatus of the present invention is shown to comprise a receiver 103 for receiving reservation-recording information generated from a key input unit 300 otherwise used normally for operating the TV 200, a microcomputer 101 for storing the reservation-recording information received through the receiver 103 in its internal memory and controlling the camcorder in accordance with the received reservation-recording information, a signal output circuit 104 for outputting recording information under the control of the microcomputer 101 to operate the TV 200, and a recording system 109 for recording the broadcasting signal transmitted through a line L2 from the TV 200 on a recording medium under the control of the microcomputer 101. Herein, the key input unit 300 may be, for example, a remote controller.

The microcomputer 101 is operative in response to signals inputted therein through another key input 105 under control of the user.

The apparatus 100 of the present invention also comprises a mode indicator 106 operative in response to the control of the microcomputer 101 for allowing the user to recognize the presently controlled state of the camcorder.

The apparatus 100 of the present invention also comprises an on screen display (OSD) unit 107 for receiving character data from the microcomputer 101 and outputting a character signal based on the inputted character data, and a mixer 108 for mixing a video signal inputted therein with the character signal from the OSD unit 107 and outputting the mixed signal to the television 200 via a separate line L1. At this time, the output signal from the mixer 108 is displayed on a screen of the TV 200.

The operation of the apparatus 100 with the above-mentioned construction in accordance with the present invention will hereinafter be described in detail with reference to FIG. 1.

As shown in FIG. 1, in order to record the broadcasting signal being received through an ANT of the TV 200 in the camcorder, a video output terminal Vo1 of the apparatus 100 must first be connected to a video input terminal Vi2 of the TV 200 over line L1. Also, a video output terminal Vo2 of the TV 200 must be connected to a video input terminal Vi1 of the apparatus 100 via the line L2.

Under this condition, the user pushes a reception (RX) memory mode key on the key input unit 105 in the apparatus 100, which also includes a standby key and a plurality of function keys other than the RX memory mode key. When the RX memory mode key on the key input unit 105 is pushed by the user, the microcomputer 101 recognizes this particular actuation and maintains a state capable of receiving the reservation-recording information through the receiver 103. Also, the microcomputer 101 outputs control signals through its terminals RX and TV/CAM to turn on light emitting diodes LED2 and LED3 in the mode indicator 106, respectively. The illumination of the light emitting diodes LED2 and LED3 in the mode indicator 106 allows the user to recognize that the camcorder is in a state in which it can receive the reservation-recording information, namely in an RX memory mode.

The microcomputer 101 also outputs character data through its terminal D to instruct the user to generate the reservation-recording information. At this time, the microcomputer 101 first outputs a chip enable signal through its terminal CE and then a clock signal through its terminal CK and the character data through its terminal D. Upon receiving the chip enable signal from the microcomputer 101, the OSD unit 107 is operative to receive the character data from the microcomputer 101 and to output a character signal based on the inputted character data.

The mixer 108 mixes the video signal inputted therein with the character signal from the OSD unit 107 and outputs the mixed signal to the television 200 through the video output terminal Vo1 of the apparatus 100. As is well-known, it is preferred that the video signal to be mixed in the mixer 108 is a "blue" signal for generating a blue background on the screen.

The character signal mixed with the video signal and then outputted through the video output terminal Vo1 of the apparatus 100 is inputted to the video input terminal Vi2 of the TV 200 through the line L1 and displayed on the screen of the TV 200. It is noted here that the character signal is displayed as a phrase indicative of an input request for information regarding a program to be reservation-recorded.

Accordingly, watching the screen of the TV 200, the user can generate reservation-recording information regarding the program to be reservation-recorded. Namely, watching the screen of the TV 200, the user operates the TV remote controller 300 to generate the reservation-recording information regarding the program to be reservation-recorded. As mentioned above, the reservation-recording information generated by the TV remote controller 300 is received by the receiver 103 in the apparatus 100. It is noted herein that the TV remote controller 300 outputs code signals of square waves of infrared wavelengths corresponding to its particular keys. The microcomputer 101 stores the reservation-recording information received through the receiver 103 in its internal memory and outputs the character data to the OSD unit 107 to display it on the screen.

Then, upon completion of the input of the reservation-recording information, the user pushes the standby key on the key input unit 105. Upon receiving a standby key signal from the key input unit 105, the microcomputer 101 stops the output of the character data, maintains a standby state and checks whether the present time is the reservation-recording time of the reservation-recording information. At this time, the microcomputer 101 outputs a control signal to the signal output circuit 104 to allow the TV 200 to be maintained at the standby state.

When the present time is in accord with the reservation-recording time of the previously set reservation-recording information, the microcomputer 101 outputs a control signal such that the signal output circuit 104 outputs recording information. Namely, under the control of the microcomputer 101, the signal output circuit 104 outputs a power-on-signal to turn on the TV 200 and a channel signal based on the reservation-recording information. In the signal output circuit 104, a transistor TR1 is driven in response to the control signal from the microcomputer 101, thereby causing a light emitting diode LED1 to output a square wave of infrared wavelength.

At this time, the TV 200 is operated by receiving the power-on signal and the channel signal from the signal output circuit 104 at its receiver 201. Upon receiving the power-on and channel signals, the TV 200 is turned on and then selects a channel corresponding to the channel signal. As a result, in the TV 200, a broadcasting signal of the selected channel is tuned and then outputted through the video output terminal Vo2. The broadcasting signal outputted through the video output terminal Vo2 of the TV 200 is inputted to the video input terminal Vi1 of the apparatus via the line L2.

The broadcasting signal inputted through the video input terminal Vi1 of the apparatus 100 is applied to a head 110 through the recording system 109 under the control of the microcomputer 101. The head 110 acts to record the broadcasting signal on a cassette tape, which is a recording medium inserted into the camcorder.

Of course, the microcomputer 101 controls a servo system 102 as well as the recording system 109, in order to record the broadcasting signal on the cassette tape.

The signal output circuit 104 may be removed and a separate control line may be connected between the microcomputer 101 in the apparatus 100 and the TV 200 instead of the signal output circuit 104. Also, the receiver 103 may be removed and another control line may be connected between the microcomputer 101 in the apparatus 100 and the TV 200 instead of the receiver 103. In this case, keys in the TV 200 may be used to set reservation recording information instead of the TV remote controller 300.

In accordance with the above-mentioned construction of the present invention, the broadcasting signal can be reservation-recorded in the camcorder with no tuner.

Referring to FIGS. 2A and 2B there is shown a flowchart illustrating a method of reservation-recording the broadcasting signal in the camcorder in accordance with the present invention. The reservation-recording method of the present invention comprises a first general step of storing reservation-recording information from a broadcasting signal receivable apparatus into an internal memory of a recording apparatus with no tuner, a second step of operating the broadcasting signal receivable apparatus on the basis of the reservation-recording information stored at the first step when a present time is the reservation-recording time of the stored reservation-recording information, and a third step of recording the broadcasting signal from the broadcasting signal receivable apparatus operated at the second step. Herein, the recording apparatus and the broadcasting signal receivable apparatus are the camcorder and the TV 200 in FIG. 1, respectively.

The above-mentioned general reservation-recording method of the present invention will hereinafter be described in detail with reference to the figures.

Once the apparatus 100 and the TV 200 are connected, the user pushes the RX memory mode key on the key input unit 105 in the apparatus 100. The RX memory mode key is pressed by the user when the user wishes to set the apparatus to a state where it can receive external reservation information, and when the user wishes to reset the apparatus to a state where it cannot receive such information. At this time, the microcomputer 101 checks at a step S10 whether the RX memory mode key has been pushed. The RX memory mode key may be a toggle type key. If it is determined at the step S10 that the RX memory mode key has been pushed, the microcomputer 101 checks at a step S11 whether an RX memory mode has been previously set.

If it is determined at the step S1 that the RX memory mode has been set, the microcomputer 101 at a step S12 resets the RX memory mode (RX memory mode ←0) and outputs low signals through its terminals TV/CAM to turn off the light emitting diodes LED 2 and LED3 in the mode indicator 106. Also at the step S12, the microcomputer 101 outputs no character data through its terminal D, thereby to clear the OSD unit 107. In accordance with the preferred embodiment of the present invention, the OSD unit 107 may be the screen of the TV. This operation would occur when the user has pressed the RX memory mode key to turn off the RX memory mode.

If it is determined at the step S11 that the RX memory mode has not been set, the microcomputer 101 at a step S13 sets the RX memory mode (RX memory mode←1) and outputs high signals through its terminals TV/CAM to turn on the light emitting diodes LED2 and LED3 in the mode indicator 106. Also at the step S13, the microcomputer 101 outputs character data through its terminal D to instruct the user to generate reservation-recording information regarding a program to be reservation-recorded. As stated previously, the microcomputer 101 first outputs the chip enable signal through its terminal CE and then the clock signal through its terminal CK and the character data through its terminal D. The character data from the microcomputer 101 is displayed on the screen of the TV 200. This operation would occur when the user has pressed the RX memory mode key to turn on the RX memory mode.

At a step S14, the microcomputer 101 causes the screen display of the OSD unit 107 to flicker the input order of the reservation-recording information regarding the program to be reservation-recorded, so that the user operates the TV remote controller 300 in accordance with the flickering of the OSD unit 107 to generate the reservation-recording information. The reservation-recording information may contain a program broadcasting channel, the start time, the end time, etc.

The input of the reservation-recording information by the user results in the determination at the step S10 that the RX memory mode key signal has not been inputted. As a result, the microcomputer 101 checks at a step S15 whether an RX input is present. Namely, the microcomputer 101 determines whether the receiver 103 has inputted the reservation-recording information generated by the designated keys on the TV remote controller 300.

When it is determined at the step S15 that the user has generated the reservation-recording information using the TV remote controller 300, the microcomputer 101 checks at a step S16 whether the RX memory mode has been set (RX memory mode←1). The step S16 is performed to prevent the reservation-recording information from being inputted in the case where the RX memory mode has not been set.

If it is determined at the step S16 that the RX memory mode has been set, the microcomputer 101 at a step S17 receives the information codes regarding the program to be reservation-recorded, generated by the TV remote controller 300, through the receiver 103 and stores the received information codes in its internal memory. Then, the microcomputer 101 performs the step S14 repeatedly.

Upon completion of the input of the information regarding the broadcasting channel and time of the program to be reservation-recorded, the user pushes the RX memory mode key again using the TV remote controller 300. As a result, since it is determined at the step S10 that the RX memory mode key has been pushed, then the step S11 is performed.

Since it is determined at the step S11 that the RX memory mode has been set, the microcomputer 101 performs the step S12 to reset the RX memory mode. Also, the microcomputer 101 outputs the low signals through its terminals RX and TV/CAN to turn off the light emitting diodes LED2 and LED3 in the mode indicator 106 and stops the output of the character data to clear the OSD unit 107.

Following the above procedure, input of the reservation-recording information regarding the program to be reservation-recorded is completed.

Since the RX memory mode key signal input and the RX input are not present at the steps S10 and S15, respectively, completion of the input of the reservation-recording information regarding the program to be reservation-recorded, then a step S18 is performed. Also, because the RX memory mode has been reset, even if more RX information is input, the operation goes from the step S16 to the step S18.

Upon completion of the input of the reservation-recording information regarding the program to be reservation-recorded, the user pushes the standby key on the key input unit 105. At this time, the microcomputer 101 checks at the step S18 whether the standby key has been pushed or the standby key signal has been inputted.

If it is determined at the step S18 that the standby key signal has been inputted, the microcomputer 101 checks at a step S19 whether a standby mode has been set (standby mode←1). The standby key may be a toggle type key similar to the RX memory mode key. The step S19 is performed to reverse the standby mode when the standby key signal input is present at the step S18.

In other words, if it is determined at the step S19 that the standby mode has been set, the standby mode is reset at a step S20. When the standby mode has not been set, the microcomputer 101 performs a step S21 to determine whether the input of the reservation-recording information regarding the program to be reservation-recorded has been completed.

If it is determined at the step S21 that the input of all the information necessary to the reservation-recording of the program to be reservation-recorded has been completed, the microcomputer 101 at a step S22 sets the standby mode and then performs an RX direction adjustment test. Namely, the microcomputer 101 determines whether the receiver 201 in the TV 200 and the light emitting diode LED1 in the signal output circuit 104 in the apparatus 100 lie within their appropriate angular ranges, respectively.

First in the RX direction adjustment test at the step S22, the user operates a test button on the key input unit 105 in the apparatus 100. Upon operation of the test button on the key input unit 105, the microcomputer 101 outputs a test signal such as, for example, the power-on or off signal through the signal output circuit 104. Then, the TV 200 receives the test signal from the signal output circuit 104 through the receiver 201 and is operated in response to the received test signal. In the case where the signal output circuit 104 is removed and a separate control line is connected between the microcomputer 101 in the apparatus 100 and the TV 200 instead of the signal output circuit 104, the RX direction adjustment test is unnecessary.

If it is determined at the step S21 that the input of all the information necessary to the reservation-recording of the program to be reservation-recorded has not been completed, the microcomputer 101 at a step S23 resets the standby mode and then outputs an error message to the OSD unit 107 to inform the user of the erroneous information input.

The performance of the above steps has the result of completing the preparation for the reservation-recording.

Then, the microcomputer 101 performs a step S24 since the key signal inputs are not present at the steps S10, S15 and S18. At the step S24, the microcomputer 101 checks whether the standby mode has been set (standby mode←1). If it is determined at the step S24 that the standby mode has been set, the microcomputer 101 checks at a step S25 whether the present time is the reservation-recording time of an Nth program (where N is the number of programs to be recorded).

If it is determined at the step S25 that the present time is the reservation-recording time of the Nth program, the microcomputer 101 performs a step S26. Namely, at the step S26, the microcomputer 101 sets a reservation-recording mode (reservation-recording mode ←1) and outputs the TV power-on signal through the signal output circuit 104 to the receiver 201 in the TV 200. As a result, the TV 200 is operated in response to the power-on signal from the signal output circuit 104. Then, the microcomputer 101 outputs the channel signal to the TV 200, so that the program to be reservation-recorded is broadcast. As a result, the video signal of the program to be reservation-recorded is outputted from the video output terminal Vo2 of the TV 200 to the video input terminal Vi1 of the apparatus 100 and then recorded on the cassette tape through the recording system 109 and the head 110 in the apparatus 100.

While the performance of the reservation-recording is in progress, the microcomputer 101 performs a step S27 where the microcomputer 101 checks whether the reservation-recording mode has been set.

When a determination that the performance of the reservation-recording is progressing has been made as a result of the determination at the step S27, the microcomputer 101 makes a determination that the reservation-recording mode has been set. Then, the microcomputer 101 at a step S28 checks whether the present time corresponds to a predetermined reservation-recording stop time. When the present time corresponds to the predetermined reservation-recording stop time, the microcomputer 101 at a step S29 resets the reservation-recording mode (the reservation-recording mode←0) and clears information about the program recorded.

If it is determined at the step S25 that the present time is not the reservation-recording time of the Nth program, the microcomputer 101 then performs the step S27 for checking the setting of the reservation-recording mode. When a determination that the reservation-recording of the Nth program has been completed has been made as a result of the determination at the step S27, the microcomputer 101 makes a determination that the reservation-recording mode has been reset. Then, it performs a step S30.

That is, the number of programs to be recorded is incremented by one (N=N+1) so that reservation-recording for a next program can be carried out.

Recording of all the reserved programs is carried out by incrementing the number of the programs. Generally, the maximum number of reservation-recordable programs is eight, although it may be increased, if necessary.

As apparent from the above description, the present invention allows a camcorder, which is unable to receive broadcasting signals, to reservation-record broadcasting programs.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

In particular, the procedures for reservation-recording broadcasting signals in the camcorder may be varied or changed, without being limited to those illustrated in the flowchart.

As mentioned above, the inputted information about the reservation-recording programs is preferably displayed on the TV screen, in the form of character data, in accordance with the- present invention. Where the camcorder is equipped with a separate OSD unit, the information may be displayed on that OSD unit.

In accordance with the present invention, completion of inputting information about reservation-recording programs is preferably accomplished by re-pushing the RX memory mode key. Alternatively, the microcomputer may recognize the completion of inputting information from the actuation of a separate information input completion key.

What is claimed is:

1. A method of reservation-recording a broadcasting signal in a camcorder, which is a combined video camera and videotape recorder without a tuner, comprising the steps of:

(a) storing reservation-recording information including a reservation recording time in an internal memory of said camcorder;

(b) sending control signal from said camcorder to a receiver external to said camcorder to control said receiver on the basis of the reservation-recording information stored at said step (a) when the present time is the reservation-recording time of the stored reservation-recording information, so as to output the broadcasting signal to said camcorder; and (c) recording, by means of said camcorder, the broadcasting signal from the receiver controlled at said step (b).

2. A method as set forth in claim 1, further comprising the steps of:

testing whether information from said camcorder is inputted to said receiver.

3. A method as set forth in claim 1, wherein the reservation-recording information stored at said step (a) is generated by a remote controller for controlling said receiver.

4. A method as set forth in claim 1 wherein said receiver is a television.

5. A method as set forth in claim 1, wherein the reservation-recording information are code signals for controlling said broadcasting signal receivable means.

6. A method as set forth in claim 1, wherein the reservation-recording information further includes a command for actuating a television that houses the receiver.

7. A method as set forth in claim 1, wherein the receiver comprises the tuner and a display means for displaying the broadcasting signal.

8. A camcorder, which is a combined video camera and video tape recorder without a tuner, said camcorder comprising:

receiving means for receiving reservation-recording information, generated from a key input means, for controlling a broadcasting signal receivable means external to said camcorder;

a microcomputer means for storing the reservation-recording information received through said receiving means into internal memory and controlling the camcorder in accordance with the received reservation-recording information;

signal output means for outputting control information under the control of said microcomputer means to control said broadcasting signal receivable means; and recording means for recording a broadcasting signal transmitted from said broadcasting signal receivable means on a recording medium under the control of said microcomputer means.

9. A camcorder as set forth in claim 8, wherein said receiving means includes an electrical control line.

10. A camcorder as set forth in claim 8, wherein said signal output means includes an electrical control line.

11. A camcorder as set forth in claim 8, further comprising:

a mode indicator means operative in response to the control of said microcomputer means for allowing the user to recognize a presently controlled state of the camcorder.

12. A camcorder as set forth in claim 8, further comprising:

an on screen display means for inputting character data from said microcomputer means and outputting a character signal based on the inputted character data; and a mixer for mixing a video signal inputted therein with the character signal from said on screen display unit and outputting the mixed signal.

13. A camcorder as set forth in claim 8, wherein said key input means includes a remote controller for controlling said external broadcasting signal receivable means.

14. A camcorder as set forth in claim 8, wherein said broadcasting signal receivable means is a television.

15. A camcorder as set forth in claim 8, wherein the control information from said signal output means are code signals for controlling said broadcasting signal receivable means.

16. A camcorder, comprising:

an input for reservation-recording information;

a memory, connected with said input, which stores the reservation-recording information;

a controller, connected with said memory and responsive to the reservation-recording information, which forwards control information indicative of a desired broadcast signal to be recorded in accordance with the reservation-recording information;

an output, connected with said controller, adapted to output the control information to a broadcast-signal receiver external to said camcorder;

recording circuitry for recording the desired broadcast signal received by the external receiver; and a broadcast signal input linking the external receiver with said recording circuitry.

17. A camcorder according to claim 16, wherein said memory and said controller are incorporated into a single microcomputer.

18. A camcorder according to claim 16, wherein the reservation-recording information includes timing information, and wherein said camcorder further comprises:

a timing source that generates clock signals; and a comparator that activates said controller to forward the control information upon determining a predetermined relationship between the timing information and the clock signals.

19. A camcorder according to claim 18, wherein said memory, said controller, said timing source, and said comparator are incorporated into a single microcomputer.

20. A camcorder according to claim 16, wherein the control information includes a signal indicative of a selected broadcast channel and a signal prompting the external receiver to output the desired broadcast signal to said broadcast signal input.

21. A camcorder according to claim 16, wherein the control information includes a signal prompting the external receiver to terminate output of the desired broadcast signal to said broadcast signal input.

22. A camcorder according to claim 16, wherein said output comprises a circuit adapted to receive the control information and output the control information as an infrared signal compatible with a control information input of the external receiver.

23. A camcorder according to claim 16, wherein said input for reservation-recording information is configured to receive the reservation-recording information from a remote controller configured to control the external broadcast-signal receiver.

* * * * *